Patented Feb. 7, 1939

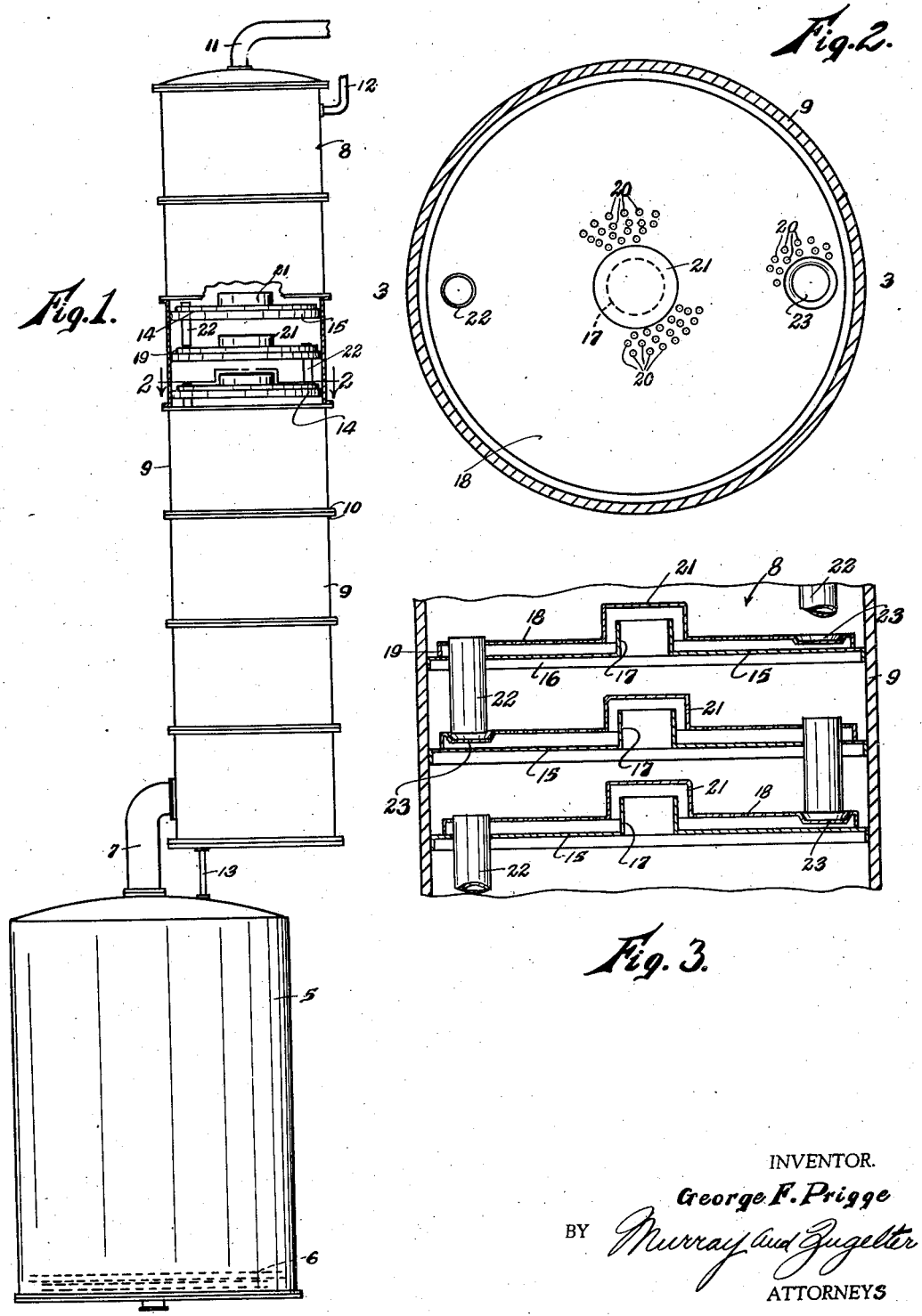

2,146,651

UNITED STATES PATENT OFFICE 2,146,651

REFINING APPARATUS

George F. Prigge, Dayton, Ky., assignor to Ansonia Copper & Iron Works, Inc., Cincinnati, Ohio, a corporation of West Virginia Application October 27, 1936, Serial No. 107,912

3 Claims. (Cl. 261—113)

This invention relates to distilling apparatus for the treatment of volatile liquids such as alcohol. The invention is particularly concerned with a novel rectifying column adapted for the distilling, fractionating, and refining of volatile liquids.

An object of the invention is to provide means for purifying and refining volatile liquids in an improved and highly efficient manner involving a marked saving of time in the rectifying process.

Another object is to provide means for breaking up the vapors evolved during the distilling process so that the impurities therein may be quickly and efficiently removed.

Another object is to provide a novel boiling tray to be incorporated in rectifying columns.

Another object is to provide such a tray comprising a minimum of parts and therefore adapted for efficient manufacture and use.

These and other objects are attained by the means described herein and illustrated in the accompanying drawing, in which:

Fig. 1 is an elevational and somewhat diagrammatic view of a kettle still and an associated rectifying column, the latter having means of the present invention incorporated therein, the rectifying column being shown with parts broken away.

Fig. 2 is a cross sectional view on the line 2—2 of Fig. 1.

Fig. 3 is a cross sectional view on the line 3—3 of Fig. 2, with parts broken away.

The process with which the present invention is concerned, contemplates broadly the steps of first heating the unpurified volatile liquid in a still and causing the vapors thus developed to pass into a rectifying column where these vapors are purified by having the foreign materials removed therefrom by passage through a series of liquid baths. These baths, in the case of alcohol distillation, are built up by the condensation of liquids—water for the most part—and other impurities. After the vapors have passed through the series of baths in the rectifying column, they are introduced into dephlegmator and condenser tubes after which the distillate is removed from the system.

Heretofore, the vapors evolved in the process broadly described above have been handled in more or less mass form so that the purification of the vapors involved a considerable amount of time. Furthermore, the means heretofore employed for the purification of volatile liquids have operated at a rather low efficiency so that either an extended amount of time was required for thorough purification or else the condensate drawn off was not absolutely rectified.

The present invention provides means for breaking up the masses of vapor into a multiplicity of small streams which are readily acted upon by the liquid bath and the other means provided in accordance with the present invention. In this way, thorough purification can be effected efficiently and in a minimum of time.

In greater detail, and with reference to the drawing: In Fig. 1 there is represented a kettle still 5 having suitable steam coils 6 in the bottom and connected, as by the vapor pipe 7, with a rectifying column 8. This column, as illustrated herein, may comprise a plurality of cylindrical sections 9, each formed at its extremities with flanges 10 which, in the formation of the column, are placed and suitably secured together to form a column of desired length.

The upper end of the column is provided with a vapor pipe 11 through which the purified vapors are introduced into dephlegmator and condenser tubes (not shown) and from which tubes the final distillate is removed. The top and bottom of the column 8 may likewise have associated therewith the reflux pipes 12 and 13. The broad features of the apparatus just described are well known and need not be further detailed.

According to the present invention the rectifying column has disposed therein a plurality of boiling trays 14 positioned in vertically spaced relation. As illustrated, each section 9 of the column may have associated therewith a selected number of the trays, three being shown herein for the purpose of illustration. Each tray consists of a condensation plate 15 which is of peripheral outline similar to the cross sectional outline of the interior of the column section 9 with which it is associated. The condensation plate 15 may be formed with an edge flange 16 which is suitably attached to the interior face of the column 9 and which plate forms, in effect, a liquid or vapor containing shelf. The plate 15 is provided with a vapor flue 17 projecting upwardly therefrom. This flue may be positioned centrally of the plate 15, as herein illustrated.

Positioned above the plate 15 is a perforate plate 18 suitably supported, such as by an edge flange 19 resting upon the plate 15. The surface of plate 18, in all but its central portion, is formed with a plurality of small apertures 20. The central portion of the plate is formed upwardly into a non-perforate cap 21 disposed over the flue 17 of the associated condensation plate and of such dimensions and position as to be in spaced relation with the flue.

Each of the boiling trays 14 has cooperating therewith an overflow pipe 22, suitably associated with the condensation and perforate plates. The upper end of the overflow pipe projects above the perforate plate 18 and the bottom end of said pipe extends downwardly into adjacent relationship with the perforate plate 18 of the next lower boiling tray in the column. The overflow pipes, as seen in Fig. 3, are preferably positioned adjacent the peripheries of the boiling trays, with the overflow pipe of one tray disposed on the side opposite from the overflow pipe of the adjacent trays, that is, in staggered relation.

Each of the perforate plates 18, immediately beneath the lower end of the overflow pipe of the tray above, is provided with a recess or dished portion 23. Inasmuch as the lower ends of the overflow pipes project into substantially the same plane as the perforate plates beneath, these recessed portions preclude contact between the pipes and perforate plates and provide for free liquid flow through the pipes. It will be seen that the recessed portions 23 are preferably non-perforate for a purpose to be later described.

In operation, the vapors evolved in the kettle still 5 pass upwardly into the column 8, and rise into contact with the condensation plates 16 of the several trays in the rectifying column. The vapors are deflected through the flues 17 and are directed downwardly, by the caps 21 around the outside of the flues 17. It will be understood that a liquid bath of condensate, is maintained on each of the boiling trays, at a level substantially that of the overflow pipe connected with each tray. Thus, the perforate plate 18 is maintained submerged beneath the condensate. Hence, the vapors deflected downwardly by the caps 21 spread through the liquid bath and in passing upwardly therethrough are split up into a multiplicity of small streams by the apertures 20 of the perforate plates. Thereafter, the vapors from one tray rise up and follow a similar course with relation to the next tray above and finally leave the top of the rectifying column and pass into suitable dephlegmator and condenser tubes, being thereafter removed as a purified distillate.

The temperature of the liquid baths on the several boiling trays is directly in relation to the position of the individual tray above the still. As the vapors pass upwardly through the liquid baths, they are, due to the fact of their being in the form of minute streams, readily affected by the temperatures of the liquid baths and foreign substances in the vapor streams having boiling temperatures higher than that of the liquid bath, are condensed and carried off in the bath. The uncondensed vapors, however, continue to rise upwardly in the column, containing a progressively smaller amount of foreign material as they approach the top of the column. Thereafter, the vapors, now of a desired strength and purity, pass out of the column to be condensed in the separate apparatus already mentioned. It may be noted that the dished portions 23, being imperforate, do not permit a mass of vapor to arise through the associated bath at this point, and furthermore precludes vapors from rising through the overflow pipe adjacent said dished portion. These dished portions, moreover, hold liquid even when the body of the liquid bath, as during non-operation of the column, has descended beneath the perforated plate to the condensation or non-perforate plate of the tray. The result is that a permanent liquid seal is provided on the lower ends of the downflow pipes so that, when operation of the system is restarted, there is no initial escape of vapors upwardly through the downflow pipes. The number of perforations in each perforate plate 18 is such as to accommodate all the vapor that can be passed upwardly through the associated flue 17.

It will be understood that the rectifying process may be prolonged or shortened according to the length of the column and number of boiling trays utilized. The fact that the dished portions or recesses 23 project below rather than above the associated perforate plate 18 makes possible a relatively shallow liquid bath which expedites the distilling process inasmuch as the vapors are permitted to rise through the boiling trays more rapidly. Moreover, the shallower bath makes a lower temperature of the liquid possible, with a consequent better distillation product, especially in the distillation of such products as ethyl alcohol where a high temperature of the baths results in undesirable vapors rising along with those intended to be acted on. At the same time, said recesses or "bays" assure effective liquid sealing of the overflow pipes 22 regardless of agitation of the liquid baths resulting from increased pressure or movement of rising vapors.

The present invention, due to the simplicity of its parts, is adapted for efficient manufacture and assembly.

Various modifications of the means herein disclosed may be resorted to without departing from the spirit of the present invention.

What is claimed is:

1. Rectifying apparatus comprising a column, and a plurality of boiling trays positioned in the column in vertically spaced relation, each tray comprising a condensation plate, a vapor flue projecting upwardly from each condensation plate, a perforate plate positioned above each condensation plate, a non-perforate cap on each perforate plate and disposed over the flue of the associated condensation plate in spaced relation with said flue, an overflow pipe projecting through each tray with its upper end extending above the associated perforate plate and its bottom end extending adjacent the perforate plate of the next lower tray and into a plane below the upper end of the overflow pipe of said lower tray, and a recessed or dished portion in each perforate plate immediately beneath the lower end of the overflow pipe of the tray above and extending above and clear of the condensation plate beneath.

2. Rectifying apparatus comprising a column, and boiling trays positioned in the column in vertically spaced relation, each tray comprising a condensation plate, a perforate plate positioned above the condensation plate, an overflow pipe projecting through the tray and having its lower end extending adjacent the perforate plate of the next lower tray, and a recessed or dished portion in the perforate plate immediately beneath the lower end of the overflow pipe of the tray above and extending clear of the condensation plate beneath.

3. Rectifying apparatus comprising a column, and boiling trays positioned in the column in vertically spaced relation, each tray comprising a condensation plate, a perforate plate positioned above the condensation plate, an overflow pipe projecting through the tray and having its lower end extending adjacent the perforate plate of the next lower tray, and an imperforate recessed or dished portion in the perforate plate immediately beneath the lower end of the overflow pipe of the tray above.

GEORGE F. PRIGGE.